(12) United States Patent
Rittle et al.

(10) Patent No.: US 7,672,269 B2
(45) Date of Patent: Mar. 2, 2010

(54) METHODS OF DISTRIBUTING AN INSTALLATION PROGRAM ON A WIRELESS LINK AND SUPPORTING MEMORY CIRCUIT AND APPARATUS

(75) Inventors: Loren J. Rittle, Naperville, IL (US); Chen Jia, Vernon Hills, IL (US); Nitya Narasimhan, Lake Zurich, IL (US); Venugopal Vasudevan, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 340 days.

(21) Appl. No.: 11/276,111

(22) Filed: Feb. 14, 2006

(65) Prior Publication Data

US 2007/0189200 A1    Aug. 16, 2007

(51) Int. Cl.
*H04Q 7/00* (2006.01)
(52) U.S. Cl. .................. 370/328; 370/252; 370/349; 370/476; 370/392; 709/222; 709/213; 709/229; 709/225; 707/203
(58) Field of Classification Search ............... 370/328, 370/252, 349, 392, 476; 709/222, 213, 214, 709/226
See application file for complete search history.

(56) References Cited

U.S. PATENT DOCUMENTS

| | | | | |
|---|---|---|---|---|
| 5,715,456 A * | 2/1998 | Bennett et al. | ................. | 713/2 |
| 5,727,205 A * | 3/1998 | Bell et al. | ................... | 707/200 |
| 5,752,042 A * | 5/1998 | Cole et al. | ................... | 717/173 |
| 5,892,952 A * | 4/1999 | Seko et al. | ................... | 717/174 |
| 6,111,673 A * | 8/2000 | Chang et al. | ................... | 398/79 |
| 6,157,953 A * | 12/2000 | Chang et al. | ................. | 709/225 |
| 6,760,324 B1 * | 7/2004 | Scott et al. | ................... | 370/352 |
| 6,760,756 B1 * | 7/2004 | Davis et al. | ................. | 709/215 |
| 6,789,112 B1 * | 9/2004 | Freeman et al. | ............. | 709/223 |
| 6,807,580 B2 * | 10/2004 | Freeman et al. | ............. | 709/249 |
| 6,944,185 B2 * | 9/2005 | Patki et al. | ................... | 370/474 |
| 6,973,314 B2 * | 12/2005 | Wilson et al. | ............ | 455/452.1 |
| 7,103,661 B2 * | 9/2006 | Klein | ........................ | 709/225 |
| 7,116,640 B2 * | 10/2006 | Tasman et al. | ............. | 370/252 |
| 7,139,809 B2 * | 11/2006 | Husain et al. | ............. | 709/213 |
| 7,200,144 B2 * | 4/2007 | Terrell et al. | ................ | 370/389 |
| 7,254,386 B2 * | 8/2007 | Rajaram | ..................... | 455/418 |
| 7,269,186 B2 * | 9/2007 | Abrol et al. | ................. | 370/476 |
| 7,382,741 B2 * | 6/2008 | Rao | .......................... | 370/255 |
| 7,426,195 B2 * | 9/2008 | Mukherjee et al. | .......... | 370/328 |
| 7,487,405 B1 * | 2/2009 | Surlaker et al. | ............... | 714/49 |
| 2002/0007407 A1 | 1/2002 | Klein | | |
| 2002/0080755 A1 | 6/2002 | Tasman et al. | | |
| 2006/0271661 A1 * | 11/2006 | Qi et al. | ..................... | 709/223 |

\* cited by examiner

*Primary Examiner*—Marceau Milord

(57) ABSTRACT

A self-contained installation program having at least one payload condition is provided (314) and distributed (316) to a plurality of selected nodes, using a wireless link, that subsequently installs the self-contained program based, at least in part, on a correspondence with the at least one payload condition. Examples of such payload conditions include, but are not limited to, an ability to sense at least one physical property, a deployment role or physical address of the receiving node, a physical location of the receiving node, available node resources, group membership, and so forth.

15 Claims, 3 Drawing Sheets

METHODS OF DISTRIBUTING AN INSTALLATION PROGRAM ON A WIRELESS LINK AND SUPPORTING MEMORY CIRCUIT AND APPARATUS

TECHNICAL FIELD

This invention relates generally to distribution of an installation program via a wireless link.

BACKGROUND

In the current wireless communication link (e.g., Wireless Sensor Networks), one reprogramming thunk, which is a piece of coding that provides an address, is sent per target node. Because multiple round-trip transmissions are typically needed in order to update a node according to its specific configurations, this can be costly in terms of transmission energy on a wireless network. This unnecessary waste is especially detrimental on a wireless cellular communication system. As an example, the energy cost to inject one multicast payload at maximum size versus N smaller payloads directed M times is approximately total node count M versus an average hop count of M times N, respectively. As shown, the injection of one multicast payload at maximum size is more efficient.

As a result, one proposed solution is to multicast the installation program to all units. This solution, however, is inadequate, because it assumes that the same application is running on all nodes of the system and/or that sufficient memory circuit is available to retain complete copies of all program text to be run on any portion of the nodes. The assumption is generally incorrect, since the nodes generally have different configurations. Thus, this proposed solution is limited and not effective.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
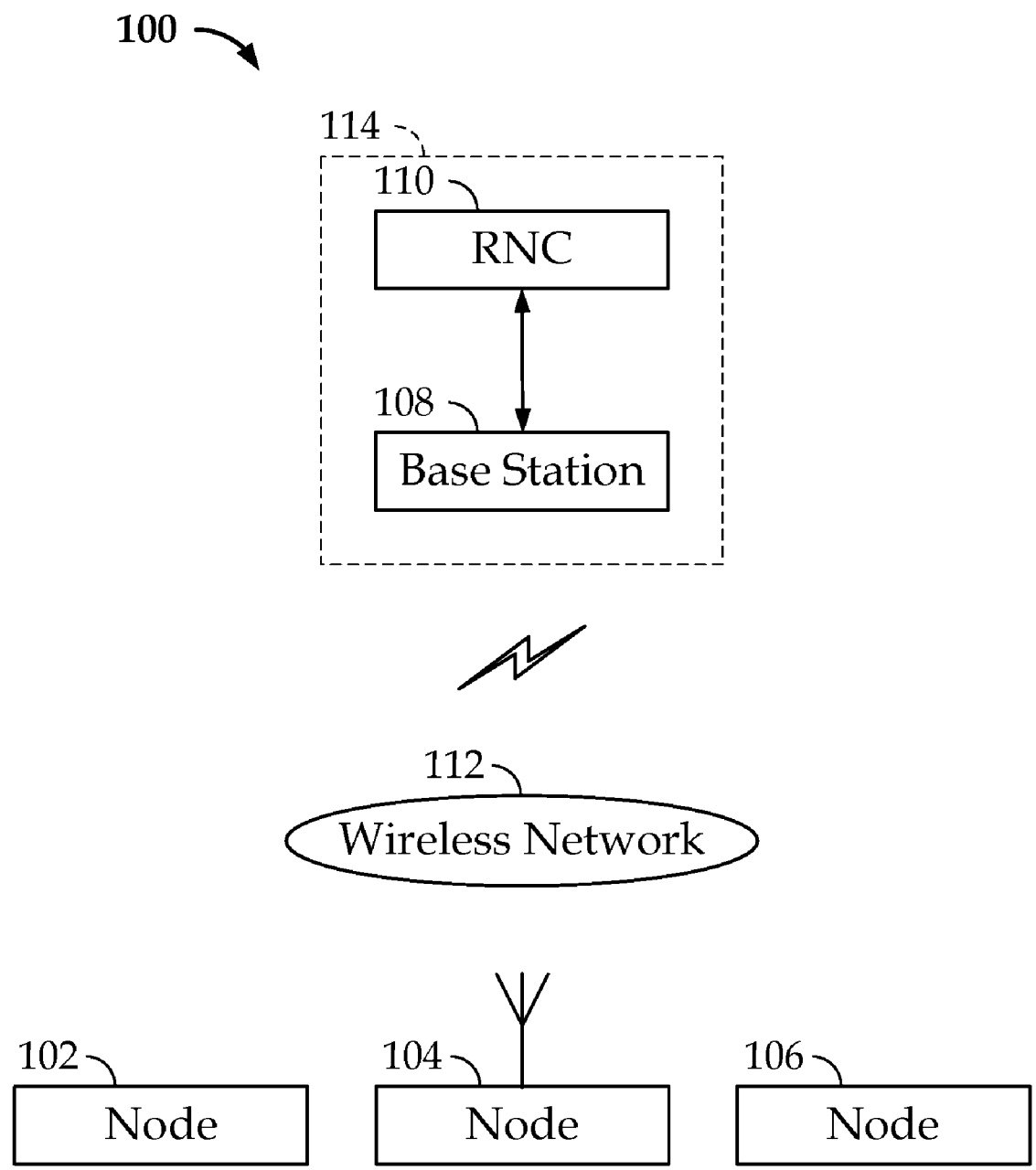
FIG. 1 comprises a block diagram of a typical wireless communication system suitable for various embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a self-contained installation program having at least one payload condition is provided and distributed, using a wireless link, to a plurality of selected nodes that subsequently installs the self-contained program based, at least in part, on a correspondence with the at least one payload condition. In one specific embodiment, an installation program is provided and added with the at least one payload condition to generate the self-contained installation program. According to one embodiment, these selected nodes are selected based, at least in part, on one or more payload conditions of the self-contained installation program.

In one embodiment, these selected nodes are selected based, at least in part, on a predefined criterion, and the one or more payload conditions are based, at least in part, on at least one characteristic of the plurality of selected nodes, which is used to generate the self-contained installation program. For an embodiment, substantially all the nodes on the wireless link are selected to provide the plurality of selected nodes, and the at least one payload condition is provided such that the self-contained installation program is substantially universal to all the nodes on the wireless link.

According to various embodiments, a memory circuit may be provided having a data structure of the self-contained installation program for distribution on a wireless link, wherein the data structure includes a first field having at least one payload condition related to the self-contained installation program and a second field having executable codes for at least partial installation of the self-contained installation program. For an embodiment, the data structure further includes a third field having at least one item of configuration information related to the at least partial installation of the self-contained installation program.

According to various embodiments, an apparatus is provided with a memory circuit having at least one payload condition related to a self-contained installation program, a controller circuit operably coupled to the memory circuit that provides the self-contained installation program having the at least one payload condition to a plurality of selected nodes using the wireless link, and a transceiver circuit coupled to the controller circuit that distributes the self-contained installation program to the plurality of selected nodes that subsequently install the self-contained installation program based, at least in part, on a correspondence with the at least one payload condition. In one embodiment, the controller circuit further installs the self-contained installation program. According to another embodiment, the controller circuit also further extracts distribution information from the self-contained installation program and the transceiver circuit distributes the self-contained installation program to at least one second selected node based, at least in part, on the at least one payload condition and the distribution information.

In various embodiments, the self-contained installation program does not require round-trip packets to complete installation of the self-contained installation program. The payload condition, in another embodiment, is at least tailored based, at least in part, on at least one characteristic of one of the plurality of selected nodes. For one embodiment, the self-contained installation program is installed. In an embodiment, distribution information is further extracted from the self-contained installation program and distributed to at least one second selected node based, at least in part, on the payload condition and the distribution information.

According to various teachings, the at least one predefined criterion may include the ability to sense at least one physical property, the deployment role of a node, at least one physical address of a node, and at least one physical location of a node. Furthermore, the payload condition includes an ability to sense at least one physical property, a deployment role of a node, at least one physical address of a node, at least one physical location of a node, possession of available resources, a lack of current higher priority task assignment, group membership of a node, a local random selection, and/or a nearby node running a related task.

Through the embodiments of various teachings provided, an improved technique for distributing an installation program on a wireless link has been provided that, among other things, reduces the round-trip transmissions for distributing an installation program, while maintaining a more secure system of program updates for the nodes. Moreover, through the various teachings, a self-contained installation program can be distributed with minimal round trip transmissions. Since the distribution of the self-contained installation program is made based, at least in part, on the payload condition, the installation program can be more customized and more tailored to the selected nodes. As a result, unnecessary round trip transmissions are minimized, resulting in a substantially single trip distribution of the installation program. Consequently, energy is conserved to provide a more efficient distribution of installation program for updates of the nodes on the wireless link.

Referring now to the drawings, and in particular to FIG. 1, for purposes of providing an illustrative but non-exhaustive example to facilitate this description, a specific operational paradigm using a wireless communication network is shown and indicated generally at 100. Those skilled in the art, however, will recognize and appreciate that the specifics of this illustrative example are not specifics of the invention itself and that the teachings set forth herein are applicable in a variety of alternative settings. For example, since the various teachings are not platform dependent, they can be applied to any communication network that includes different types of data transmission. Thus, any digital broadcast services or digital satellite services may also applicable. These various platforms and network implementations are, as a result, within the scope of the invention, and various embodiments for these multiple implementations are readily understood and appreciated by one skilled in the art.

Pursuant to this example, multiple nodes 102, 104, 106 are adapted to communicate with a base station ("BS") 108 that is operably coupled to a radio network controller ("RNC") 110 via a wireless network 112. As commonly known in the art, the RNC 110 typically controls multiple BSs 108 (one shown) for data transmission between the nodes 102, 104, 106 and the serving BS 108. In this example, typical of a general communication network, the nodes 102, 104, 106 send requests and/or data to the serving BS 108, which, in turn, forwards the requests and/or data to the RNC for processing.

The BS 108 and the RNC 110, as shown, cooperatively route data to multiple nodes 102, 104, 106, but depending upon the system, the network may include other components with different arrangement of these components. Thus, the communication system 100 shown is only one of many typical exemplary structures of a communication network that is suitable for use with various described embodiments. Moreover, the RNC 110 along with the BS 108 will herein be referred to as a server 114 to emphasize that the data exchange may include communications with either or both the RNC and the BS, depending upon the configuration of the system.

Figure 2:
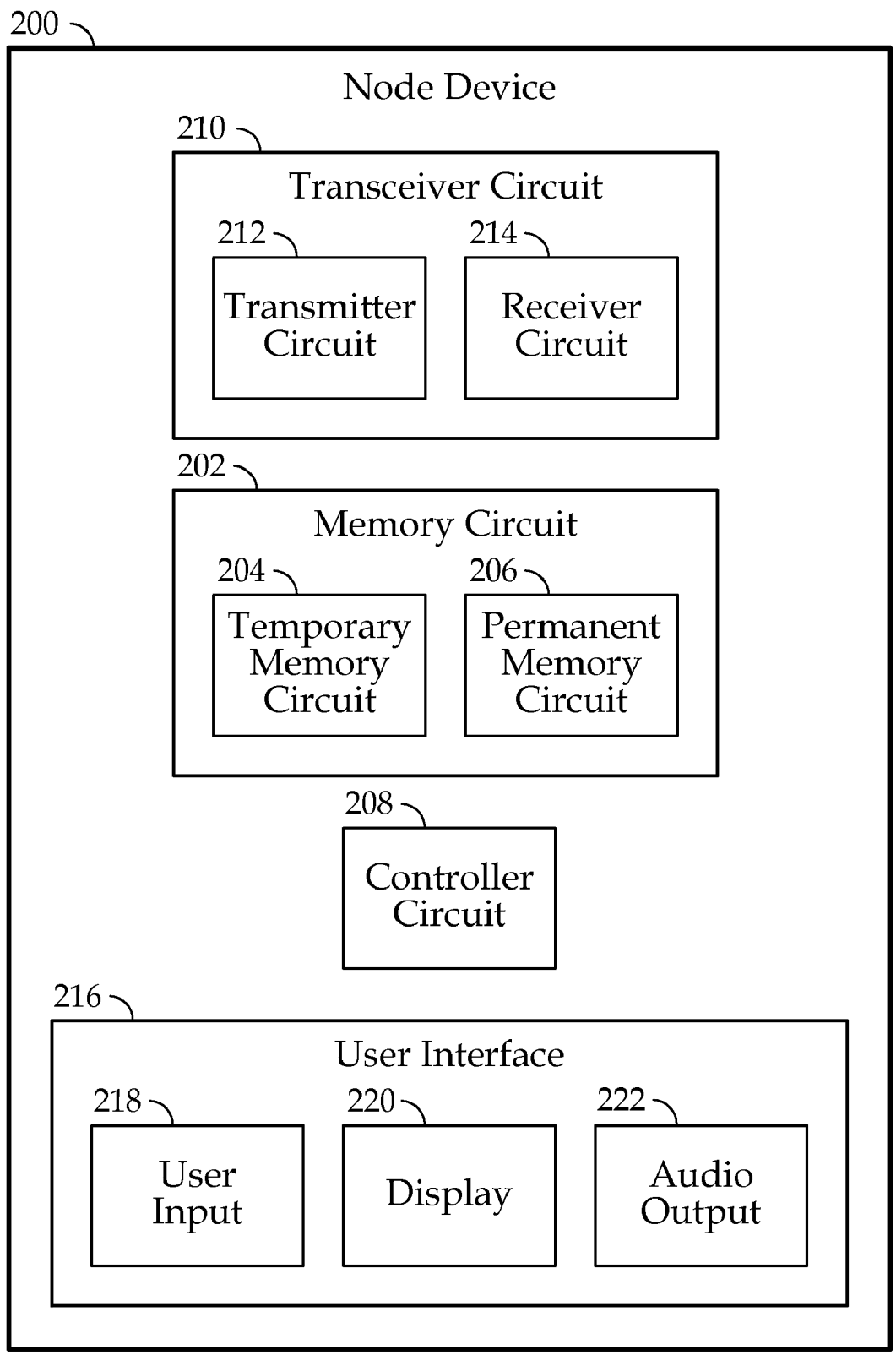
FIG. 2 comprises a node apparatus according to various embodiments of the present invention.

Turning now to FIG. 2, a block diagram of a node device according to various embodiments is shown and indicated generally at 200. Please note that as readily appreciated by one skilled in the art, the circuits and the arrangement of these circuits shown are only given as one of many configurations and circuitry topologies available, and these various alternative embodiments, although not shown, are readily appreciated by a skilled artisan. Thus, these alternative embodiments are within the scope of the various teachings described. It is further assumed that these circuits are coupled or connected to each other in the block diagram. Moreover, since the node device shown is a partial view of circuitry topology of a general communication device, the node 200 shown does not necessarily include all of the components required of a typical communication device. As such, it should be understood that the various teachings may include other circuit components that may not be shown but are well known to one skilled in the art. Moreover, "circuit" refers to one or more component devices such as, but not limited to, processors, memory circuit devices, application specific integrated circuits (ASICs), and/or firmware, which are created to implement or adapted to implement (perhaps through the use of software) certain functionality, all within the scope of the various teachings described.

According to this embodiment shown, a memory circuit 202 having both a temporary memory circuit 204 and a permanent memory circuit 206 is included for storing at least one payload condition that is related to a self-contained installation program. A controller circuit 208, which is operably coupled to the memory circuit 202, provides the self-contained installation program with the at least one payload condition for distribution to a plurality of selected nodes using the wireless link. A typical transceiver circuit 210 having a transmitter circuit 212 and a receiver circuit 214 is coupled to the controller circuit 208. The transceiver circuit 210, specifically the transmitter circuit 212, distributes the self-contained installation program to the plurality of selected nodes that subsequently install the self-contained installation program based, at least in part, on a correspondence with the at least one payload condition. A user interface 216 is also provided, which includes a user input 218, a display 220, and an audio output 222.

In various embodiments, the memory circuit 202 includes a data structure of the self-contained installation program for distribution on the wireless link. Specifically, the data structure includes a first field having at least one payload condition related to the self-contained installation program and a second field having executable codes for at least partial installation of the self-contained installation program. In one embodiment, the data structure further includes a third field having at least one item of configuration information related to the at least partial installation of the self-contained installation program. Moreover, the memory circuit 218 can also be used as a computer-readable medium to store the computer-executable instructions implemented with the various embodiments of the invention.

In one specific embodiment, the controller circuit 208 also further installs the self-contained installation program. Moreover, in another embodiment, the controller circuit 208 extracts distribution information from the self-contained installation program, and the transceiver circuit 210 accordingly further distributes the self-contained installation program to at least one second selected node based, at least in part, on the at least one payload condition and the distribution information. Using various embodiments, the payload condition may include the ability to sense at least one physical property, the deployment role of a node, at least one physical address of a node, at least one physical location of a node, possession of available resources, lack of current higher priority task assignment, group membership of a node, a local random selection, and/or a nearby node running a related task.

Figure 3:
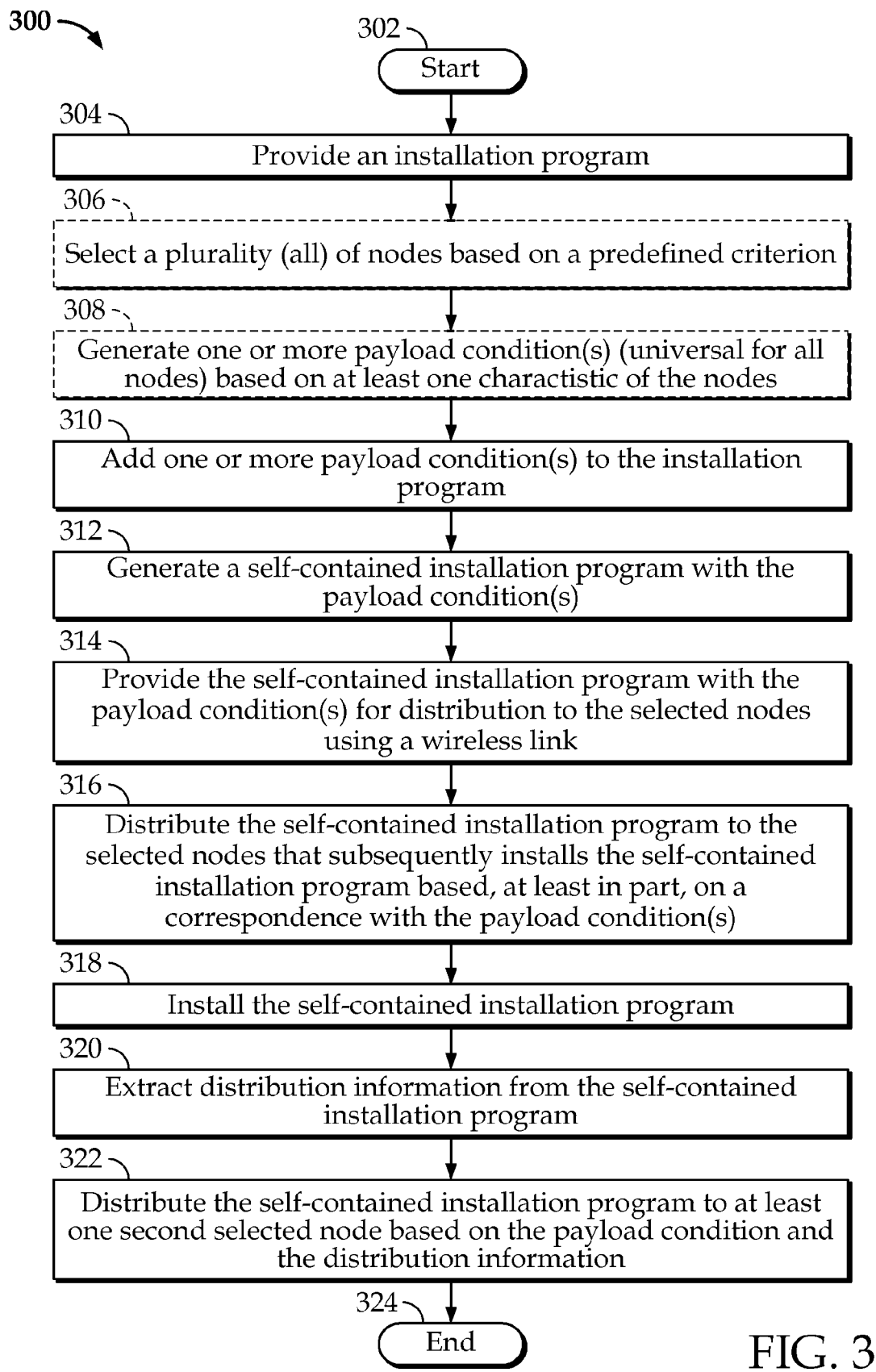
FIG. 3 comprises a flow chart diagram of a process according to various embodiments of the present invention.

Turning now to FIG. 3, a flow chart diagram of a process according to various embodiments of the invention is shown and indicated generally at 300. Although the process shown may be implemented either at the server level and/or the node device level, there may be other implementations better suited for other components in the communication system. For example, these processes, as shown, can be implemented fully or partially at either the node 102 or server 110. Thus, as a skilled artisan would readily appreciate, the flow diagram may be altered according to these different implementations.

And as such, other embodiments of the process are contemplated and are within the scope of the various teachings shown. Moreover, as one skilled in the art would readily appreciate, any of the processes shown can be altered in multiple ways to achieve the same functions and results of the various teachings described. As a result, these processes shown are one exemplary embodiment of multiple embodiment variations that may not be specifically shown. These other embodiments, however, are within the scope of the various teachings described.

In this particular example shown, the process starts 302 by providing 304 an installation program. According to a particular embodiment, a plurality of nodes is selected 306 based on a predefined criterion in which one or more payload conditions are generated 308 based on at least one characteristic of these selected nodes. For one embodiment, substantially all of the nodes are selected to provide these selected nodes and the payload condition is generated based on at least one characteristic of these selected nodes. Since substantially all of the nodes are selected, the payload condition would be more universal to all the nodes instead of an alternative embodiment that is customized to certain selected groups of nodes.

Once the payload condition is obtained, it is added 310 to the installation program to generate 312 a self-contained installation program having the payload condition. The self-contained installation program is then provided 314 for distribution to the selected nodes using the wireless link. Depending upon the implementation, the self-contained installation program is distributed 316 to the selected nodes, which subsequently installs it based, at least in part, on a correspondence with the payload condition. According to one embodiment, this self-contained installation program is further installed 318. In a particular embodiment, distribution information is further extracted 320 from the self-contained installation program and distributed 322 to a second set of nodes based on the payload condition and the distribution information. The process ends 324 at this point.

With these various teachings shown, an improved technique for distributing an installation program on a wireless link has been provided that, among other things, reduces the round-trip transmissions for distributing an installation program, while maintaining a more secure system of program updates for the nodes. Moreover, through the various teachings, a self-contained installation program can be distributed with minimal round trip transmissions. Since the distribution of the self-contained installation program is made based, at least in part, on the payload condition, the installation program can be more customized and more tailored to the selected nodes. As a result, unnecessary round trip transmissions are minimized, resulting in a substantially single trip distribution of the installation program. Consequently, energy is conserved to provide a more efficient distribution of installation program for updates of the nodes on the wireless link Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method to distribute an installation program on a wireless link comprising:
   providing a self-contained installation program having at least one payload condition for distribution to a plurality of selected nodes using the wireless link by:
      generating at least one payload condition based, at least in part, on at least one characteristic of the plurality of selected nodes;
      generating the self-contained installation program having the at least one payload condition;
   extracting distribution information from the self-contained installation program;
   selecting the plurality of selected nodes based, at least in part, on a predefined criterion;
   distributing the self-contained installation program to the plurality of selected nodes that subsequently installs the self-contained installation program based, at least in part, on a correspondence with the at least one payload condition;
   distributing the self-contained installation program to at least one second selected node based, at least in part, on the at least one payload condition and the distribution information.

2. The method according to claim 1 further comprising:
   receiving an installation program;
   adding the at least one payload condition to the installation program to provide the self-contained installation program.

3. The method according to claim 1 further comprising:
   selecting the plurality of selected nodes based, at least in part, on the at least one payload condition of the self-contained installation program.

4. The method according to claim 1, wherein the at least one predefined criterion comprises any one or more selected from a group of:
   ability to sense at least one physical property;
   deployment role of a node;
   at least one physical address of a node;
   at least one physical location of a node.

5. The method according to claim 1 further comprising:
   selecting substantially all nodes on the wireless link to provide the plurality of selected nodes;
   providing the at least one payload condition such that the self-contained installation program substantially universal to substantially all the nodes on the wireless link.

6. The method according to claim 1 wherein the self-contained installation program does not require round-trip packets to complete installation of the self-contained installation program.

7. The method according to claim 1, wherein the at least one payload condition is at least tailored based, at least in part, on at least one characteristic of one of the plurality of selected nodes.

8. The method according to claim 1, wherein the at least one payload condition comprises any one or more selected from a group of:
   ability to sense at least one physical property;
   deployment role of a node;
   at least one physical address of a node;
   at least one physical location of a node;
   possession of available resources;
   lack of current higher priority task assignment;
   group membership of a node;

a local random selection;
a nearby node running a related task.

9. The method according to claim 1 further comprising:
installing the self-contained installation program.

10. A memory circuit comprising a data structure of a self-contained installation program for distribution on a wireless link, the data structure comprising:
   a first field having at least one payload condition related to the self-contained installation, wherein the at least one payload condition is generated based, at least in part, on at least one characteristic of a plurality of selected nodes that are to receive the self-contained installation program and that have been selected based, at least in part, on a predetermined criterion;
   a second field having executable codes for at least partial installation of the self-contained installation program;
   a third field having at least one item of configuration information related to the at least partial installation of the self-contained installation program.

11. The memory circuit according to claim 10, wherein the at least one payload condition comprises any one or more selected from a group of:
   ability to sense at least one physical property;
   deployment role of a node;
   at least one physical address of a node;
   at least one physical location of a node;
   possession of available resources;
   lack of current higher priority task assignment;
   group membership of a node;
   a local random selection;
   a nearby node running a related task.

12. The memory circuit according to claim 10, wherein the self-contained installation program does not require round-trip packets to complete installation of the self-contained installation program.

13. An apparatus comprising:
   a memory circuit having at least one payload condition related to a self-contained installation program;
   a controller circuit operably coupled to the memory circuit, wherein the controller circuit provides the self-contained installation program having the at least one payload condition to a plurality of selected nodes using the wireless link, and wherein the controller circuit further extracts distribution information from the self-contained installation program and the transceiver circuit distributes the self-contained installation program to at least one second selected node based, at least in part, on the at least one payload condition and the distribution information;
   a transceiver circuit coupled to the controller circuit, wherein the transceiver circuit distributes the self-contained installation program to the plurality of selected nodes that subsequently install the self-contained installation program based, at least in part, on a correspondence with the at least one payload condition.

14. The apparatus according to claim 13, wherein the at least one payload condition comprises any one or more selected from a group of:
   ability to sense at least one physical property;
   deployment role of a node;
   at least one physical address of a node;
   at least one physical location of a node;
   possession of available resources;
   lack of current higher priority task assignment;
   group membership of a node;
   a local random selection;
   a nearby node running a related task.

15. The apparatus according to claim 13, wherein the controller circuit further installs the self-contained installation program.

* * * * *